Patented Mar. 24, 1942

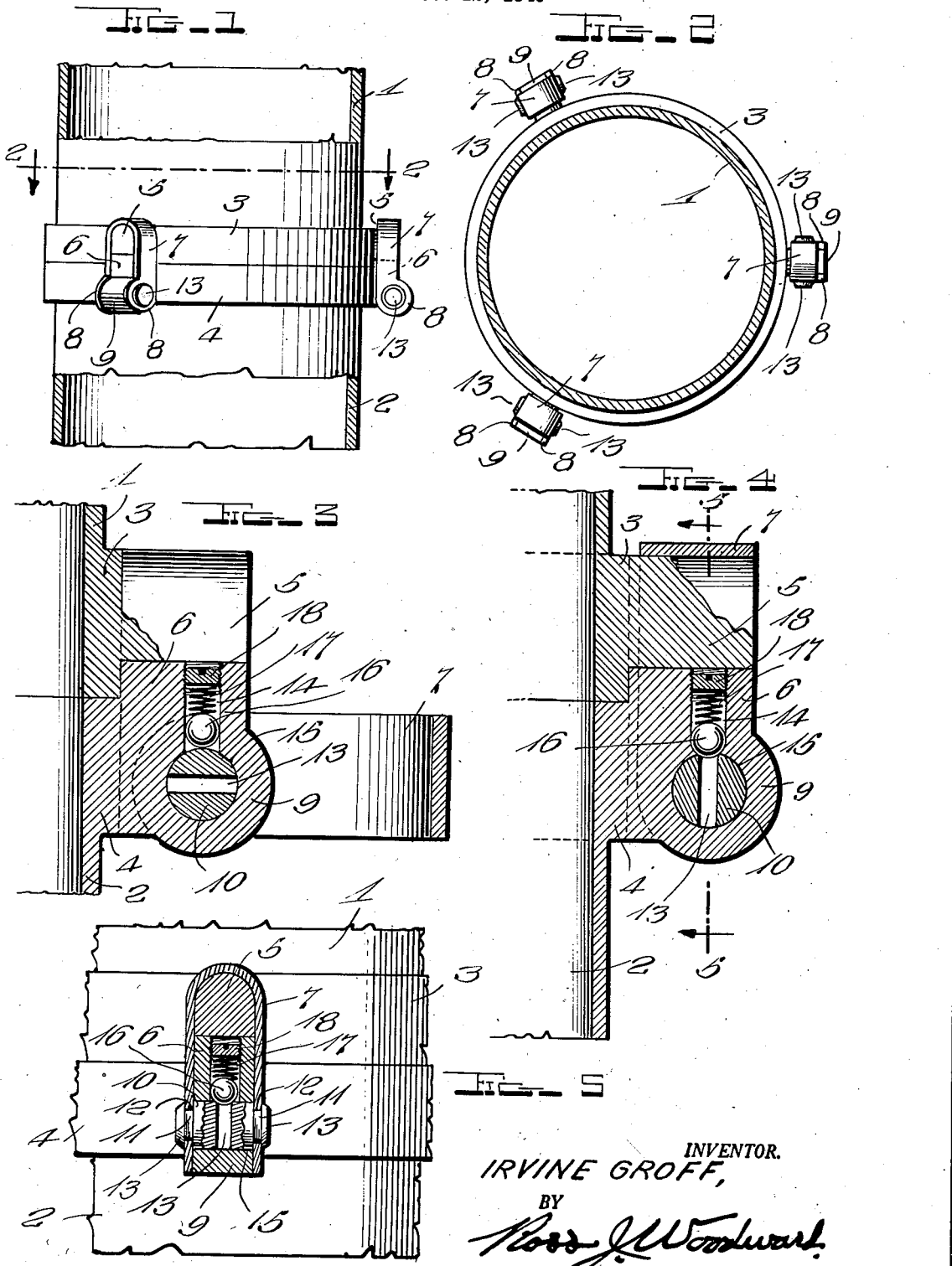

2,277,399

UNITED STATES PATENT OFFICE 2,277,399

PIPE COUPLING

Irvine Groff, Preston, Ontario, Canada, assignor of one-half to Louisa S. Groff, Baden, Ontario, Canada Application December 12, 1940, Serial No. 369,894
In Canada December 26, 1939

2 Claims. (Cl. 285—172)

This invention relates to pipe couplings and it is one object of the invention to provide a coupling by means of which pipe sections may be very easily coupled and securely held in end to end engagement with each other.

Another object of the invention is to so form the coupling that companion elements thereof may be coupled or uncoupled without the use of a wrench or the like, usually used for screwing coupling members into tight engagement with each other.

It is another object of the invention to provide a coupling wherein the companion elements are provided with lugs, the lugs of one element carrying securing yokes for engaging the lugs of the other element and the lugs of the first element also serving to overlap the second element and prevent the two elements from moving out of alinement with each other.

Another object of the invention is to so mount the yokes or clips that they may be easily swung to a securing position or a releasing position and, in addition, to provide spring actuated latches for yieldably holding the clips in operative position.

Another object of the invention is to provide a pipe coupling which is simple in construction, strong and durable, and very easy to operate and not liable to become broken or damaged.

In the accompanying drawing:

Fig. 1 is a view showing the improved coupling in side elevation.

Fig. 2 is a transverse sectional view on the line 2—2 of Fig. 1.

Fig. 3 is a fragmentary sectional view on an enlarged scale, showing the yoke or clip in inoperative or releasing position.

Fig. 4 is a view similar to Fig. 3, showing the yoke or clip in operative position.

Fig. 5 is a view taken on the line 5—5 of Fig. 4.

The improved pipe coupling is employed as means for detachably connecting pipe sections 1 and 2 which may be sections of a pipe line such as used for ensilage cutters, chaff blowers, grain elevators, or the like, it being understood that the coupling may be used for detachably connecting the sections of any pipe line for which it is suitable. The pipe sections carry, at their ends, collars 3 and 4 which are formed integral with the sections, and from an inspection of the drawing, it will be seen that when the pipe sections are to be coupled, they are disposed in end to end engagement with each other with the collar 3 of one section abutting the collar 4 of the adjoining section. It will be obvious that the end portions of a pipe section carrying the collars may be formed integral with the remainder of the pipe section or may be formed separate therefrom and secured in place in any manner desired.

Lugs or arms 5 and 6 extend radially from the collars 3 and 4. These lugs are spaced from each other circumferentially of the collars and are of solid formation so that they will be very strong and not likely be broken off. The lugs or arms 5 are spaced from the outer end of the collar 3 and lugs 6 project from the collar 4, as shown in Figs. 3 and 4, so that when two pipe sections are disposed in end to end engagement with each other, the lugs 6 will project in overlapping engagement with the outer marginal edge face of the collar 3 for abutting engagement with the lugs 5 and constitute abutments which serve to prevent the pipe sections from shifting transversely out of longitudinal alinement with each other.

Clips or yokes 7m which are formed of strong metal and are of U-shaped formation, are employed to detachably hold the collars of the adjoining pipe sections in engagement with each other. These yokes have their arms formed with enlarged end portions 8 of semi-circular outline and the lugs 6 are similarly enlarged to form bearings 9 through which are rotatably mounted pins 10 by means of which the yokes are pivotally mounted.

Referring to Fig. 5, it will be seen that the end portions 11 of the pins pass through openings and protruding ends of the pins are upset to form heads 12 for firmly holding the arms of the yokes on the pins and causing the pins to turn with the yokes when the yokes are swung to the inoperative position of Fig. 3 or the operative position of Fig. 4.

Each pin is formed midway its length with a diametrically extending bore 13 and each lug 6 is formed with a bore or pocket 14 communicating with the bore 15 formed through the enlarged lower portion of the lug to rotatably receive the pin. A ball 16 of hard metal mounted in the pocket of each lug 6 and urged downwardly into engagement with the pin by a spring 17 which is held under controlled tension by a plug 18, the plug being screwed into the threaded upper portion of the pocket and having its outer face formed with a diametrically extending groove or eye so that a screw driver may be employed to adjust the plug and place the spring under desired tension. This is clearly shown in Figs. 3, 4 and 5.

When pipe sections equipped with the improved couplings are to be connected, they are placed in end to end engagement with each other and turned to a position in which the lugs or arms 6 of the collar 4 are alined with the lugs 5 of the collar 3. Since the lugs 6 overlap the side edge face of the collar 3, they will hold the collars against transverse movement out of alinement with each other. It will be obvious that a gasket may be placed between the confronting faces of the collars to form a sealed joint when the gasket is under pressure. After the collars have been disposed in engagement with each other, as set forth above, the yokes 7 are swung from the lowered inoperative position of Fig. 3 to the raised position of Fig. 4, and they will then straddle the companion lugs and exert binding action to firmly hold the collars in coupled relation to each other. In view of the fact that the balls carried by the lugs 6 enter ends of the bores 13 of the pins 10, they serve as latches to firmly hold the yokes in the raised or operative position. In view of the fact that the valve balls are urged toward the pins by the springs 17, they are yieldable and the yokes may be easily swung to lowered or inoperative position by grasping their upper ends and exerting outward swinging movement. It will thus be seen that the pipe sections may be very easily and quickly connected or released and that when they are coupled the yokes will be yieldably held in raised or operative position and prevented from accidentally slipping out of place about the lugs 5 of the collar 3.

Having thus described the invention, what is claimed is:

1. In a pipe coupling, a pipe section having a collar at its end, a second pipe section having a collar at its end disposed in end to end engagement with the first collar, lugs extending radially from the first collar and having portions extending longitudinally therefrom overlapping the outer side edge face of the second collar to prevent movement of the collars transversely of each other, lugs extending radially from the second collar in spaced relation to the outer end thereof for face to face engagement with front ends of the first lugs, and yokes pivotally carried by the lugs of one collar for movement into and out of position to engage about companion lugs of the other collar and hold the collars in abutting engagement with each other.

2. In a pipe coupling, a pipe section having a collar at its end, a second pipe section having a collar at its end disposed in end to end engagement with the first collar, lugs extending radially from the first collar and having portions extending longitudinally of the collar and overlapping the outer side edge face of the second collar to prevent movement of the collars transversely of each other, lugs extending radially from the second collar along front ends of the first lugs, the first collars having portions bored transversely to form bearings and also bored longitudinally to form pockets leading from outer faces of the lugs and having their outer end portions threaded and their inner ends communicating with the bearings, pins passing through the transverse bores and rotatable therein, yokes for fitting about companion lugs and holding the collars coupled, said yokes having their arms fixed to ends of the pins for causing the pins to turn in the bearings as the yokes are swung into and out of straddling engagement with the second lugs, and latches in the pockets having springs for urging the latches into engagement with diametrically opposed seats in the pins and tensioning members for the springs screwed into the threaded outer end portions of the pockets and constituting closures for outer ends of the pockets.

IRVINE GROFF.